(12) United States Patent
Jolic

(10) Patent No.: US 11,529,822 B2
(45) Date of Patent: Dec. 20, 2022

(54) MICRO-OPTIC DEVICE WITH INTEGRATED FOCUSING ELEMENT AND IMAGE ELEMENT STRUCTURE

(71) Applicant: CCL Secure Pty Ltd., Craigieburn (AU)

(72) Inventor: Karlo Ivan Jolic, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 0 days.

(21) Appl. No.: 17/021,684

(22) Filed: Sep. 15, 2020

(65) Prior Publication Data

US 2021/0023870 A1 Jan. 28, 2021

Related U.S. Application Data

(63) Continuation of application No. 16/091,862, filed as application No. PCT/AU2017/050331 on Apr. 13, 2017, now Pat. No. 10,792,948.

(30) Foreign Application Priority Data

Apr. 13, 2016 (AU) ................................ 2016100402

(51) Int. Cl.
*B42D 25/324* (2014.01)
*B42D 25/328* (2014.01)
(Continued)

(52) U.S. Cl.
CPC ........... *B42D 25/328* (2014.10); *B42D 25/29* (2014.10); *B42D 25/324* (2014.10);
(Continued)

(58) Field of Classification Search
CPC .................................................... B42D 25/324
See application file for complete search history.

(56) References Cited

U.S. PATENT DOCUMENTS 9,873,281 B2 * 1/2018 Cape ...................... G02B 30/27
2013/0044362 A1 * 2/2013 Commander ........ B42D 25/351
359/291
(Continued)

FOREIGN PATENT DOCUMENTS

AU 2015100385 4/2015
WO 2011/0116425 9/2011
(Continued)

OTHER PUBLICATIONS

International Search Report for International Application No. PCT/AU2017/050331 dated May 22, 2017.

*Primary Examiner* — Kyle R Grabowski
(74) *Attorney, Agent, or Firm* — Christopher M. Scherer; DeWitt LLP

(57) ABSTRACT

A micro-optic device, including: a substrate; a plurality of image elements; and a plurality of focusing elements, each focusing element focuses light towards, or causes light to be diverged from or constructively interfere at a real or imaginary focal point, the focusing elements causing the image elements to be sampled so as to project imagery which is observable to a user from at least a first viewing angle, wherein a first focusing structure including at least a first group of the focusing elements and a first imagery structure including at least a first group of the image elements are integrated into a first unitary structure on a first side of the substrate.

21 Claims, 14 Drawing Sheets

(51) Int. Cl.
    *B42D 25/29*     (2014.01)
    *B42D 25/425*     (2014.01)
    *B42D 25/435*     (2014.01)
    *B42D 25/342*     (2014.01)
    *B42D 25/333*     (2014.01)
    *G07D 7/20*     (2016.01)
    *B42D 25/378*     (2014.01)
    *G02B 3/00*     (2006.01)
    *B42D 25/23*     (2014.01)
    *B42D 25/24*     (2014.01)
    *B42D 25/351*     (2014.01)
    *B42D 25/355*     (2014.01)

(52) U.S. Cl.
    CPC ......... *B42D 25/333* (2014.10); *B42D 25/342* (2014.10); *B42D 25/378* (2014.10); *B42D 25/425* (2014.10); *B42D 25/435* (2014.10); *G02B 3/005* (2013.01); *G07D 7/20* (2013.01); *B42D 25/23* (2014.10); *B42D 25/24* (2014.10); *B42D 25/351* (2014.10); *B42D 25/355* (2014.10)

(56) References Cited

U.S. PATENT DOCUMENTS

2014/0367957 A1* 12/2014 Jordan ................. B42D 25/425
                                                                                                    283/85
2018/0196166 A1* 7/2018 Zhang ................. B42D 25/324

FOREIGN PATENT DOCUMENTS

WO         2014/118569         8/2014
WO         WO-2017105504 A1 *   6/2017   ............ B42D 25/21

* cited by examiner

MICRO-OPTIC DEVICE WITH INTEGRATED FOCUSING ELEMENT AND IMAGE ELEMENT STRUCTURE

CROSS-REFERENCE TO RELATED APPLICATIONS

The present application is a continuation of U.S. application Ser. No. 16/091,862, filed Oct. 5, 2018, which application is the U.S. national stage application of International Application No. PCT/AU2017/050331, filed Apr. 13, 2017, which international application was published on Oct. 19, 2017 as International Publication No. WO 2017/177278. The International Application claims priority to Australian Patent Application No. 2016100402, filed Apr. 13, 2016, the contents of which are incorporated herein by reference in their entireties.

TECHNICAL FIELD

The present invention relates to a micro-optic device for used in a micro-optic image presentation system. Embodiments of the invention can be used as a security device for bank notes and coins, credit cards, cheques, passports, identity cards, and the like, and it will be convenient to describe the invention in relation to that exemplary, non-limiting application.

BACKGROUND OF INVENTION

It is well known that many of the world's bank notes, as well as other security documents, bear security devices which produce optical effects enabling a visual authentication of the bank note. Some of these security devices include focusing elements, such as micro lenses or micro mirrors, which act to sample and magnify image elements and project imagery which is observable to a user for authentication purposes.

In conventional security devices, the focusing elements are formed by means of an embossing process. The image elements are subsequently formed by an additional process, typically a printing process or an additional embossing process specific for creating the imagery in a separate layer from the layer containing the focusing elements.

In such security devices, it is difficult to control the phase of the focusing elements relative to the image elements in the plane of the substrate upon which the focusing elements are embossed. This results in images being projected to a user for a given viewing angle that are different from one bank note to the next, giving the impression that the intended security feature appears different or inconsistent from one bank note to the next. This problem is particularly evident in optical effects such as flips, animations and 3D images. Depending on the phase, an animation or flip can project any one of its frames to a user at a fixed viewing angle.

Similarly, an interlaced 3D image or an integral image will vary significantly in appearance for a given viewing angle depending on the phase of the focusing elements relative to the image elements. Typically, there will exist some phases that will project a clean 3D image when the bank note is viewed directly at a normal viewing angle, and there will be other phases that will project a blurry image at a normal viewing angle that is uncomfortable to view—the user may see both "left" and "right" images of the stereoscopic pair with both eyes, making it difficult for the brain to reconcile depth/float. Phase variation will also impact on moiré imagery designs—the position of the moiré-magnified images in the magnified array, will vary in accordance with the phase.

In such security devices there will also typically exist a rotational skew between the focusing elements and the image elements, that is, a rotation around an axis perpendicular to the plane of the substrate on which the focusing elements are formed. Depending upon its size, this skew can introduce undesirable image artefacts. For example, in the case of moiré imagery designs, the magnified images can appear tilted and their size can also vary, depending on the level of relative skew. Similarly, in the case of interlaced 3D designs and integral images, these can appear tilted to an extent that is aesthetically undesirable.

The variations in relative phase in the plane of the substrate on which the focusing elements are formed (in the X,Y axes) and the relative skew (rotation about the Z axis perpendicular to the plane of the substrate), when combined, can result in large variations in the appearance of imagery projected to a user.

The imagery layer and the layer containing the focusing elements can also be stretched by different amounts in different directions during the manufacturing process, resulting in variations in the frequency (pitch) of the image elements and/or focusing elements. Such differences can lead to distortions in the projected images that cannot be compensated for through design, because the variations involved are not able to be sufficiently controlled in the manufacturing process. In the case of a roll-to-roll manufacturing process there may be tension variations/slack in the web during processing that cause different degrees of stretch that cannot be sufficiently controlled to eliminate distortion in the projected image. In the case of a sheet-fed manufacturing process there may be tension variations/slack in each sheet during processing that cause different degrees of stretch that cannot be sufficiently controlled to consistently eliminate distortion in the projected image.

It would be desirable to provide a micro-optic device including focusing elements and corresponding image elements that minimized unwanted variations in phase difference and/or skew between the focusing elements and the image elements, and also minimized unwanted variations in pitch of the focusing elements and/or image elements.

It would also be desirable to provide a method of manufacturing such micro-optic devices that minimize the cost of manufacture and waste materials resulting from the manufacturing process.

It would also be desirable to provide a micro-optic device including focusing elements and corresponding image elements that ameliorates or overcomes one or more disadvantages or inconveniences of known micro-optic devices.

SUMMARY OF INVENTION

One aspect of the invention provides a micro-optic device, including:
a substrate;
a plurality of image elements; and
a plurality of focusing elements, each focusing element focuses light towards, or causes light to be diverged from or constructively interfere at a real or imaginary focal point, the focusing elements causing the image elements to be sampled so as to project imagery which is observable to a user from at least a first viewing angle, wherein
a first focusing structure including at least a first group of the focusing elements and a first imagery structure including at least a first group of the image elements are integrated into a first unitary structure on a first side of the substrate.

In one or more embodiments, the first group of focusing elements causes the first group of image elements to be sampled.

In other embodiments, a second focusing structure including at least a second group of the focusing elements and a second imagery structure including at least a second group of the image elements is located on a second side of the substrate, wherein
the first group of focusing elements causes the second group of the image elements to be sampled.

In this case, the second focusing structure and the second imagery structure may be integrated into a second unitary structure.

Furthermore, the second group of focusing elements may cause the first group of image elements to be sampled so as to project imagery which is observable to a user from at least a second viewing angle.

In one or more embodiments, at least one focusing element is refractive and causes light to refract towards the focal point.

In this case, a layer of at least partially reflective material may be applied on the opposite side of the substrate to the at least one focusing element.

In one or more embodiments, at least one focusing element is reflective and causes substantially collimated incoming light to be diverged from the focal point.

In this case, at least part of the unitary structure including the at least one focusing element is over-coated with at least a layer of at least partially reflective material.

In one or more embodiments, at least one focusing element is diffractive and transmits or reflects light causing constructive interference of light at the focal point. The focusing element may be transmissive or reflective and the focal point may be real or virtual.

One or more embodiments, includes a layer of reflective or partially reflective material on the second side of the substrate.

In one or more embodiments, the integrated structure on the first side of the substrate includes refractive focusing elements having a convex surface.

In one or more embodiments, the reflective layer is located inside the focal length of the focusing elements.

In one or more embodiments, each focusing element has a convex surface when viewed from a first viewing position through the transparent substrate.

One or more embodiments further includes a layer of reflective or partially reflective material applied to the convex surface viewed from the first viewing position.

In one or more embodiments, image elements are recessed into the convex surface of the focusing structure.

In one or more embodiments, the focusing elements are refractive lens elements.

In one or more embodiments, the refractive focusing elements in the first and second unitary structures have a convex surface.

In one or more embodiments, the image elements of the second unitary structure are located substantially at the real focus of the lens elements of the first unitary structure.

In one or more embodiments, the image elements of the second unitary structure are located within the focal depth of the lens elements of the first unitary structure.

In one or more embodiments, the image elements of the first unitary structure are located substantially at the real focus of the focusing elements of the second unitary structure.

In one or more embodiments, the image elements of the first unitary structure are located within the focal depth of the lens elements of the second unitary structure.

Another aspect of the invention provides a micro-optic device, including: a substrate; a plurality of image elements; and a plurality of focusing elements, each one of the focusing elements focusing light towards, or causing light to be diverged from or constructively interfere at a real or imaginary focal point, wherein a first focusing structure including at least a first group of the focusing elements and a first imagery structure including at least a first group of the image elements are integrated into a first unitary structure on a first side of the substrate, wherein the image elements have a topography that is raised above adjacent focusing elements in a same unitary structure.

In one or more embodiments, the focusing elements cause the image elements to be sampled so as to project imagery which is observable to a user from at least a first viewing angle.

In one or more embodiments, the first group of the focusing elements causes the first group of the image elements to be sampled.

In one or more embodiments, a second focusing structure including at least a second group of the focusing elements and a second imagery structure including at least a second group of the image elements is located on a second side of the substrate, wherein the first group of the focusing elements causes the second group of the image elements to be sampled.

In one or more embodiments, the second focusing structure and the second imagery structure are integrated into a second unitary structure.

Another aspect of the invention provides a micro-optic device, including: a substrate; a plurality of image elements; and a plurality of focusing elements, each one of the focusing elements focusing light towards, or causing light to be diverged from or constructively interfere at a real or imaginary focal point, wherein a first focusing structure including at least a first group of focusing elements and a first imagery structure including at least a first group of the image elements are integrated into a first unitary structure on a first side of the substrate, wherein at least part of the image elements are formed from diffractive structures.

In one or more embodiments, the at least part of the image elements are formed from diffractive structures are recessed into the surface of a refractive or diffractive focusing element.

In one or more embodiments, the focusing elements cause the image elements to be sampled so as to project imagery which is observable to a user from at least a first viewing angle.

In one or more embodiments, the first group of the focusing elements causes the first group of the image elements to be sampled.

In one or more embodiments, a second focusing structure including at least a second group of the focusing elements and a second imagery structure including at least a second group of the image elements is located on a second side of the substrate, wherein the first group of the focusing elements causes the second group of the image elements to be sampled.

In one or more embodiments, the second focusing structure and the second imagery structure are integrated into a second unitary structure.

In one or more embodiments, the micro-optic device further includes a layer of coloured ink through which light is transmitted to produce coloured or tinted imagery.

In one or more embodiments, the layer of coloured ink is applied to at least part of the unitary structure on at least one side of the substrate.

In one or more embodiments, the layer of coloured ink is applied to the opposite side of the substrate to the unitary structure.

In one or more embodiments, the layer of coloured ink is applied to the imagery structure only of the unitary structure.

In one or more embodiments, the topography of the focusing elements has one or more of the following profiles: circular, elliptical, parabolic and conical.

In one or more embodiments, the focusing elements have the profile in a first direction and extend in a second direction to form a cylinder.

In one or more embodiments, the profile of the focusing element is revolved about an axis extending perpendicularly from the surface of the substrate.

In one or more embodiments, the topography of the focusing elements is one or more of: diffractive lens topography, diffractive zone plate topography or Fresnel lens topography.

In one or more embodiments, the focusing elements are packed in a rectangular or hexagonal array.

In one or more embodiments, the topography of the imaging elements is recessed relative to adjacent focusing elements.

In one or more embodiments, the topography of the imaging elements is raised, protruding or extending above adjacent focusing elements.

In one or more embodiments, the topography of the imaging elements has a constant height compared to adjacent focusing elements.

In one or more embodiments, the topography of the imaging elements is a diffraction grating.

In one or more embodiments, the topography of the imaging elements is a high roughness surface texture.

In one or more embodiments, the topography of the imaging elements is a low roughness surface texture.

In one or more embodiments, the topography of the imaging elements is a light-extinguishing texture.

In one or more embodiments, the topography of the imaging elements is a surface perturbation or mathematical function of the focusing element topography.

In one or more embodiments, the topography of the imaging elements has tapered side walls to allow easy release from an emboss tool.

In one or more embodiments, at least part of the topography of the imaging elements focuses light towards, or causes light to be diverged from or constructively interfere at a real or imaginary focal point.

Another aspect of the invention provides an embossing shim for use in manufacturing a micro-optic device according to any one of the preceding claims, the embossing shim including a surface relief structure corresponding to the first unitary structure to enable embossing of the first unitary structure in a single embossing step.

Definitions

Security Document or Token

As used herein, the terms security documents and tokens includes all types of documents and tokens of value and identification documents including, but not limited to the following: items of currency such as bank notes and coins, credit cards, cheques, passports, identity cards, securities and share certificates, driver's licences, deeds of title, travel documents such as airline and train tickets, entrance cards and tickets, birth, death and marriage certificates, and academic transcripts.

The invention is particularly, but not exclusively, applicable to security devices, for authenticating items, documents or tokens, such as bank notes, or identification documents, such as Identity cards or passports, formed from a substrate to which one or more layers of printing are applied.

More broadly, the invention is applicable to a micro-optic device which, in various embodiments, is suitable for visual enhancement of clothing, skin products, documents, printed matter, manufactured goods, merchandising systems, packaging, point of purchase displays, publications, advertising devices, sporting goods, security documents and tokens, financial documents and transaction cards, and other goods.

Security Device or Feature

As used herein, the term security device or feature includes any one of a large number of security devices, elements or features intending to protect security document or token from counterfeiting, copying, alteration or tampering. Security devices or features may be provided in or on the substrate of the security document or in or on one or more layers applied to the base substrate, and may take a wide variety of forms such as security threads embedded in layers of the security document; security inks such as fluorescent, luminescent or phosphorescent inks, metallic inks, iridescent inks, photochromic, thermochromic, hydrochromic, or peizochromic inks; printed or embossed features including release structures; interference layers; liquid crystal devices; lenses and lenticular structures; optically variable devices (OVDs) such as diffractive devices including diffraction gradients, holograms and diffractive optical elements (DOEs).

Substrate

As used herein, the term substrate refers to the base material from which the security document or token is formed. The base material may be paper or other fibrous materials such as cellulous; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

Transparent Windows and Half Windows

As used herein, the term window refers to a transparent or translucent area in the security document compared to the opaque region to which printing is applied. The window maybe fully transparent so as to allow the transmission of light substantially unaffected, or it may be partly transparent or translucent, partly allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate, a fully transparent window may be formed by omitting the opacifying layers on both sides of the transparent substrate in the window area.

A partly transparent or translucent area herein after referred to as a "half-window", may be formed in a polymeric security document which has opacifying layers on both sides by omitting the opacifying layers on one side only of the security document in the window area so that "half-window" is not fully transparent but allows sunlight to pass through without allowing objects to be viewed clearly through the half-window.

Alternatively, it is possible for the substrates to be formed from a substantially opaque material, such as paper or fibrous material, without an insert of transparent plastics material inserted into a cut out or recessed into the paper or fibrous substrate to form a transparent window or a translucent half-window area.

Opacifying Layers

One or more opacifying layers may be applied to a transparent substrate to increase the opacity of the security document. An opacifying layer is such that $L_T < L_O$ where $L_O$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Focusing Elements

One or more focusing elements may be applied to the substrate of the security device. As used herein, the term "focusing element" refers to devices that focus light towards, or cause light to be diverged from or constructively interfere at a real or imaginary focal point. Focusing elements include refractive lenses that focus incoming light to a real focal point in a real focal plane or to a virtual focal point in a virtual focal plane and also collimate light scattered from any point in the focal plane to a particular direction. Focusing elements also include convex reflective elements having a virtual focal point where incoming substantially collimated light appears to diverge from that single virtual focal point. Focusing elements also include transmissive or reflective diffractive lenses, zone plates and the like that cause the transmitted or reflected diffracted light to constructively interfere at a desired real or virtual focal point.

BRIEF DESCRIPTION OF DRAWINGS

Preferred embodiments of the invention will now be described by way of example only with reference to the accompanying drawings in which:

FIGS. 25 and 26 show cutaway side views of additional embodiments of a micro-optic device including a unitary structure of focusing elements and image elements.

DETAILED DESCRIPTION OF DRAWINGS

Figure 1:
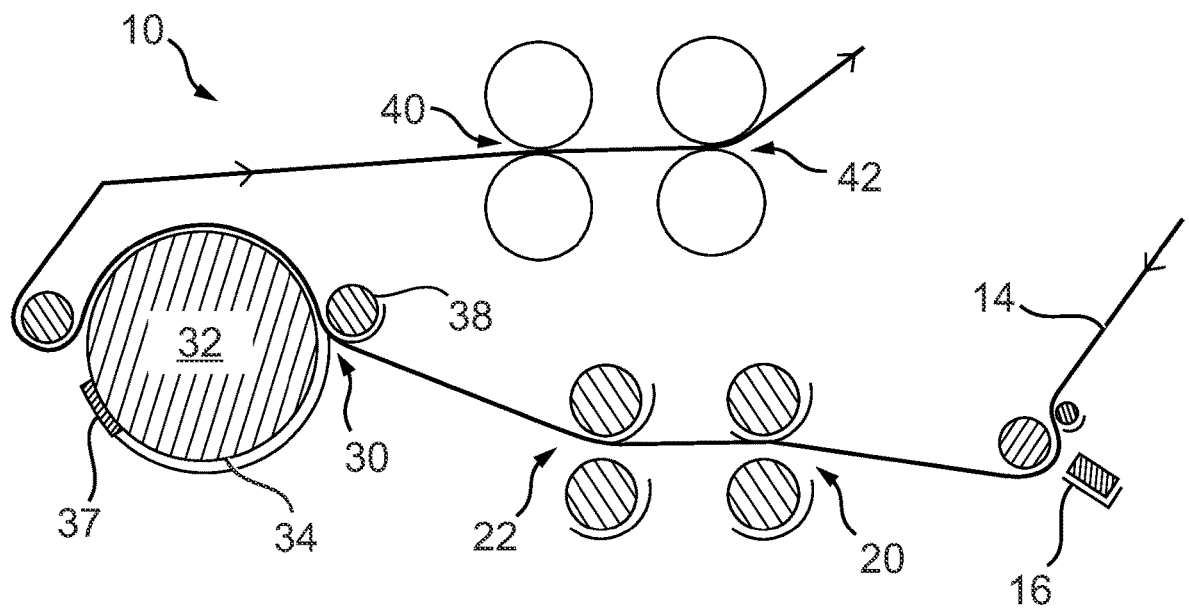
FIG. 1 is a schematic diagram of one embodiment of an apparatus for in-line manufacturing part of a security document.
Figure 2:
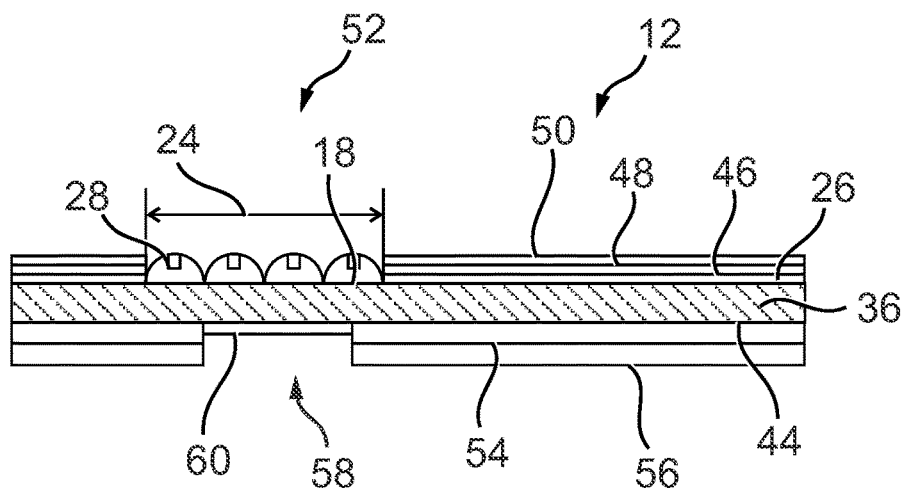
FIG. 2 is a cutaway side view of the partially manufactured security document manufactured by the apparatus of FIG. 1.

FIG. 1 shows an exemplary apparatus 10 for in-line manufacturing part of an exemplary document 12 depicted in FIG. 2. A continuous web 14 of translucent or transparent material such as polypropylene or PET is subject to an adhesion promoting process at a first processing station 16 including a roller assembly. Suitable adhesion promoting processes include flame treatment, corona discharge treatment, plasma treatment or similar.

An adhesion promoting later 18 is applied at a second processing station 20 including a roller assembly. A suitable adhesion promoting layer is one specifically adapted for the promotion of an adhesion of UV-curable coatings to polymeric surfaces. The adhesion promoting layer may have a UV curing layer, a solvent-based layer, a water-based layer or any combination of these.

At a third processing station 22 which also includes a roller assembly, the radiation sensitive coating is applied to the surface of the adhesion promoting layer 18. The radiation sensitive coating can be applied via flexographic printing, gravure printing or a silk screen printing process and variations thereof amongst other printing processes.

The radiation sensitive coating is only applied to the security element area 24 on a first surface 26 where a unitary structure 28 including a periodic array of lens elements and a periodic array of image elements is to be positioned. The security element area 24 can take the form of a stripe, a discrete patch in the form of simple geometric shape or in the form of a more complex graphical design.

While the radiation sensitive coating is still, at least partially, liquid, it is processed to form the unitary structure 28 at a fourth processing station 30. In one embodiment, the processing station 30 includes an embossing roller 32 for embossing a security element structure, such as the unitary structure 28 into a radiation sensitive coating in the form of a UV-curable ink. The cylindrical embossing surface 34 has surface relief formations corresponding to the shape of the unitary structure 28 to be formed. In one embodiment, the surface relief formations can orient the array of lens elements and the array of image elements in the machine direction, transverse to the machine direction, or in multiple directions at an angle to the machine direction. The apparatus 10 can form micro lenses and micro-imagery elements in a variety of shapes.

The cylindrical embossing surface 34 of the embossing roller 32 may have a repeating pattern of surface relief formations or the relief structure formations may be localized to individual shapes corresponding to the shape of the security elements area 24 on the substrate 36. The embossing roller 32 may have the surface relief formations formed by a diamond stylus of appropriate cross section, or by direct laser engraving or chemical etching, or the surface relief formations may be provided by at least one embossing shim 37 provided on the embossing roller 32. The at least one embossing shim may be attached via adhesive tape, magnetic tape, clamps or other appropriate mounting techniques.

The UV-curable ink on the substrate is brought into intimate contact with the cylindrical embossing surface 34 of the embossing roller 32 by a UV roller 38 at processing station 30 such that the liquid UV-curable ink flows into the surface relief formations of the cylindrical embossing surface 34. At this stage, the UV-curable ink is exposed to UV radiation, for example, by transmission through the substrate layer 36.

With the security element structure 28 applied to the document substrate 36, one or more additional layers are applied at a downstream processing station including further roller assemblies 40 and 42. The additional layers may be clear or pigmented coatings and applied as partial coating, as a contiguous coating or accommodation of both. In one preferred method, the additional layers are opacifying layers which are applied to one or both surfaces of the substrate 36 except in the region of the security element structure.

FIG. 2 shows a partially manufactured security document formed with an embossed security element structure 28 in the form of a unitary lens and image element structure having an array of lens elements and an array of image elements. These security documents comprise a transparent substrate of polymeric material, preferably by an axially orientated polypropylene (BOPP) having a first surface 26 and a second surface 44. Opacifying layers 46, 48 and 50 are applied to the first surface 26, except a window area 52 where the security element structure 28 is applied to the first surface 26.

Opacifying layers 54 and 56 are applied to the second surface 44 except in a window area 58. The window area 58 substantially coincides with the window area 52 on the first surface 26. A printed layer 60 may be applied to the second surface 44 on the opposite side of the substrate in the window area 58.

Figure 3:
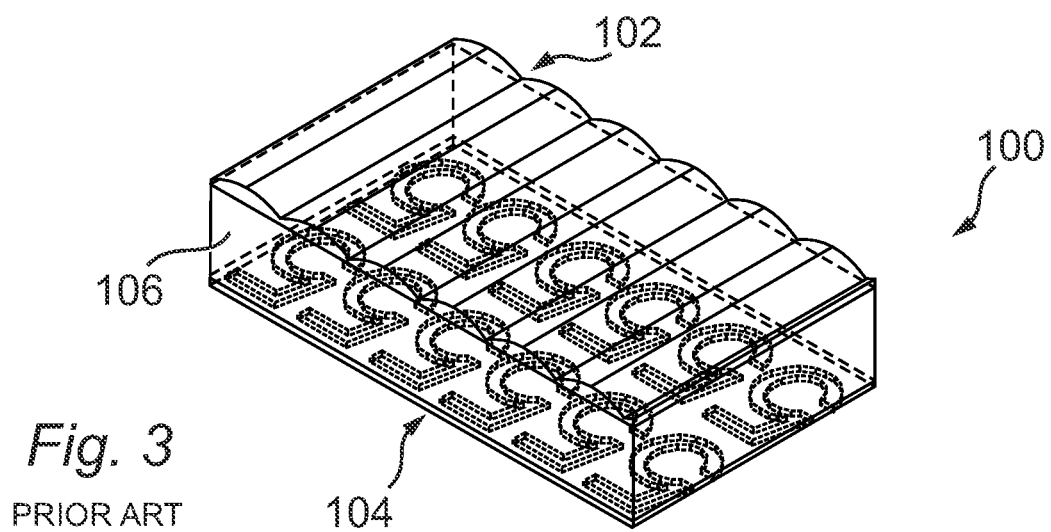
FIGS. 3 to 5 are isometric views of a prior-art micro-optic device forming part of the security document shown in FIG. 2.
Figure 4:
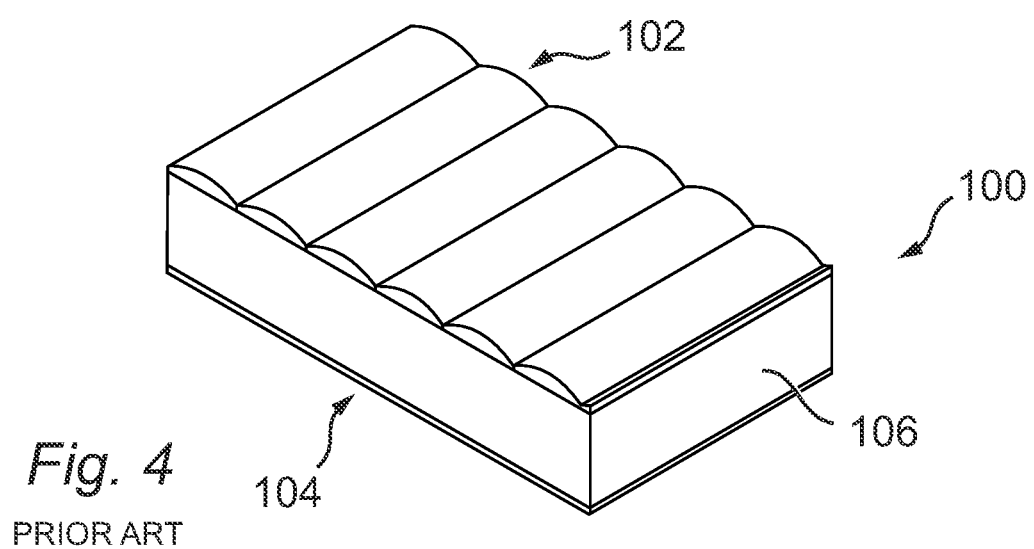
Figure 5:
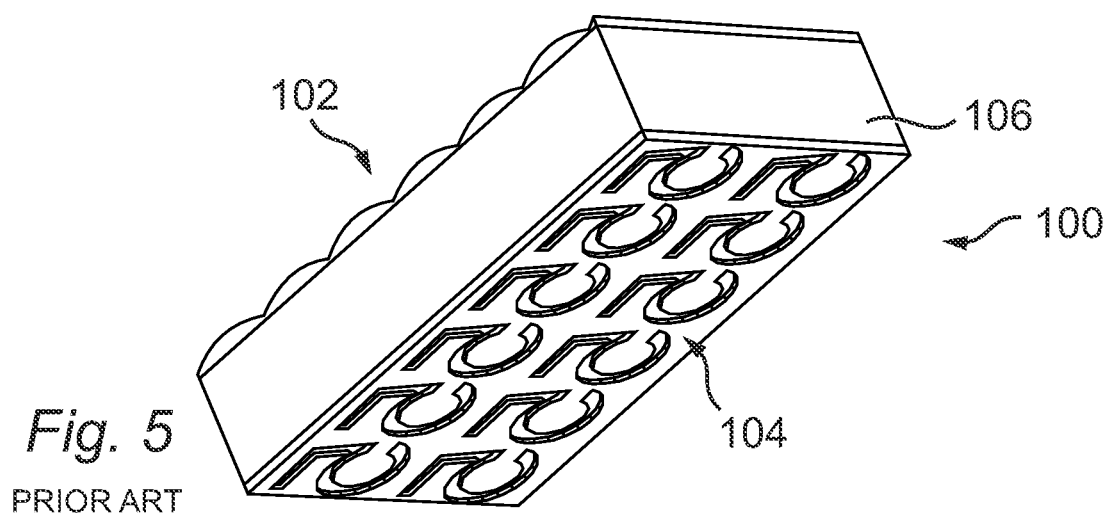

FIGS. 3 to 5 show a conventional security device 100 manufactured according to the process described and depicted in relation to FIGS. 1 and 2 to form part of a polymer bank note. The security device 100 includes an array of micro lenses applied to one side of a polymer bank note and a corresponding imagery layer 104 applied to the other side of the bank note. Typically, the lenses are embossed by the process described in relation to FIGS. 1 and 2. Typically, the imagery 104 is printed and/or embossed in a separate additional process.

Figure 6:
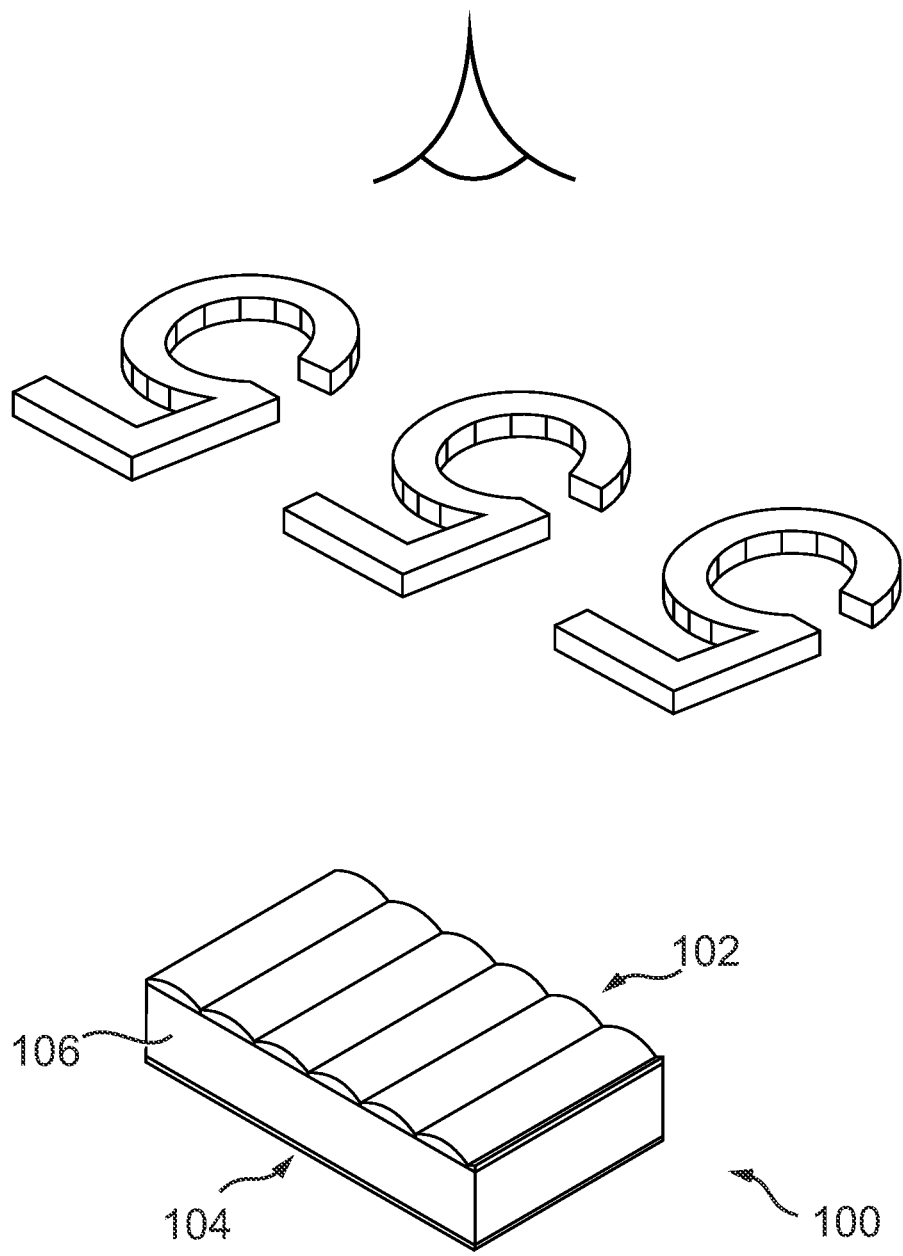
FIG. 6 shows an isometric view of the micro-optic device shown in FIGS. 3 to 5 as well as a moiré magnified image produced by that security device.

In this example, the lenses are cylindrical lenses and the imagery layer 104 is a magnifying moiré type design, consisting of an array of image elements of the numeral "5", the image elements having a slightly different pitch to that of the lens elements (the pitch difference depicted in the figures is so small that it cannot be visually discerned) so that the lens elements will project a moiré-magnified image of the numeral "5" to a user (see FIG. 6).

The value of pitch used for the image elements relative to the pitch of the lenses will determine the magnification factor of the moiré-magnified image of the numeral "5". The value of pitch used for the image elements relative to the pitch of the lens elements will also determine the 3D depth perceived in the moiré-magnified image of the numeral "5".

The image element pitch can be selected so that the moiré-magnified image can appear to be either floating in front of the bank note or behind it, depending on which is greater than or less than the pitch of the lenses.

The moiré-magnified image can be observed by viewing the security device 100 from the lens side of the substrate 106. If the security device 100 is viewed from the imagery side of the substrate, the array of image elements can be observed however because they are so small, the image elements cannot be discerned by the naked eye which means the reverse side of the security device does not produce any discernible optical effect.

In order to minimize undesirable variations in skew and relative phase and focusing element pitch and image element pitch, as well as reducing the manufacturing steps and associated costs involved in producing a security document, embodiments of the present invention provide a security device in which the focusing elements and the image elements are integrated into a unitary structure on the same side of the substrate. This enables a consistent relative phase and a consistent relative skew and a consistent relative pitch to be obtained between the focusing elements and the image elements. The unitary structure can advantageously be applied in a single embossing process. The unitary structure is achieved by combining the 3D topography of the focusing elements with the 2D design of the image elements such that a new integrated 3D topography is created.

Figure 7:
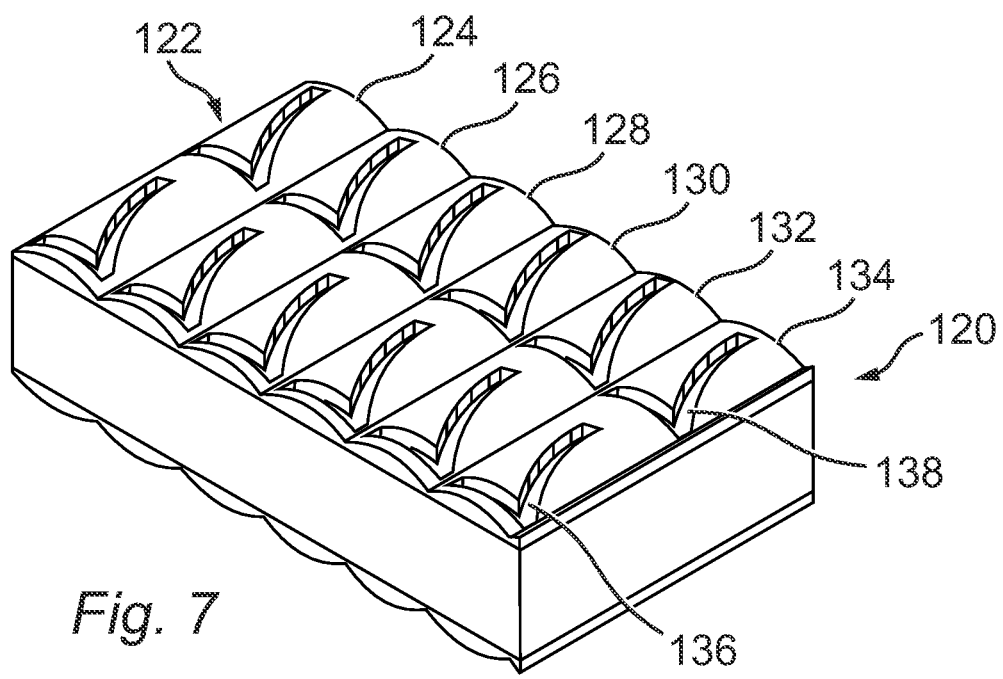
FIGS. 7 and 8 show isometric views of two embodiments of a micro-optic device including a unitary structure of focusing elements and image elements.
Figure 8:
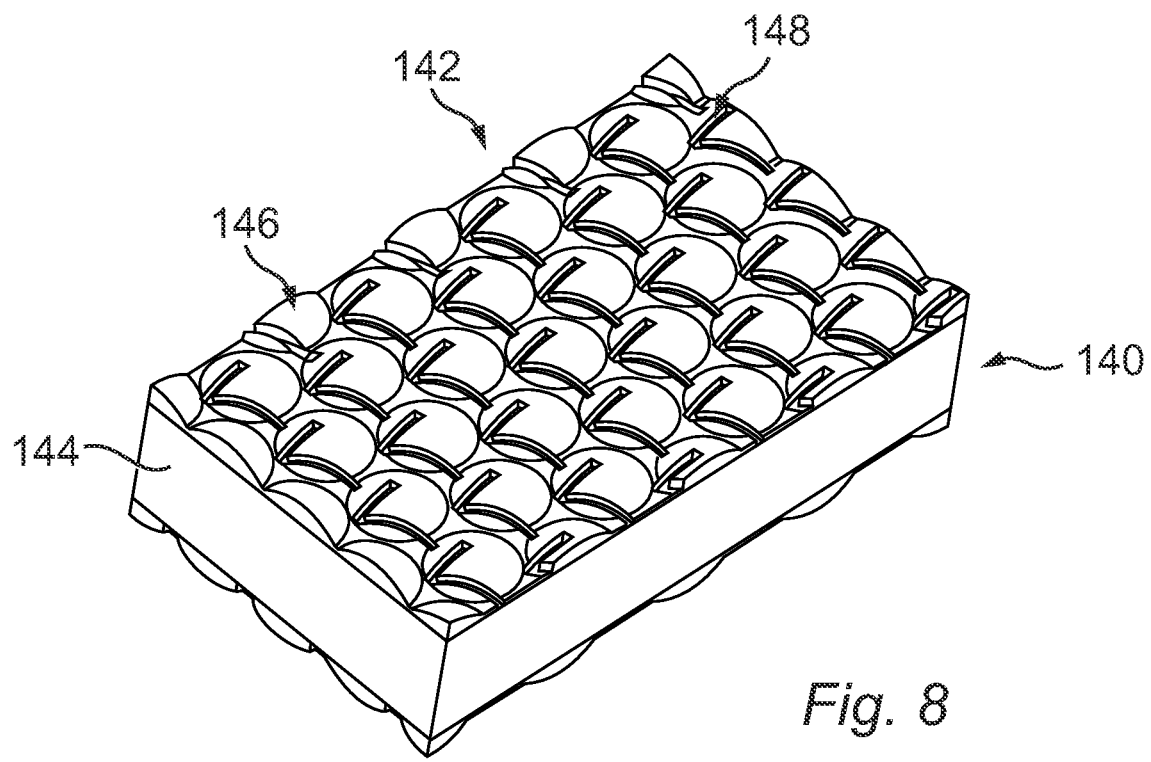

FIG. 7 depicts one example of a security device 120 in which a unitary structure 122 of cylindrical lens elements 124 to 134 and image elements, such as those referenced 136 and 138 each forming the numeral "7", are integrated with the lens element 134. FIG. 8 shows another exemplary security device 140 in which a unitary structure 142 is formed on one side of a substrate 144, the unitary structure 142 including an array 146 of hexagonal packed lens elements integrated with an array of structures each forming the numeral "7".

The arrangements depicted in FIGS. 7 and 8 are merely two examples of an integrated structure that combines the 3D topography of an array of focusing elements with a topography in which image elements are formed. In both of these examples, the topography in which the image elements are formed is recessed to a fixed depth relative to the focusing elements.

Figure 9:
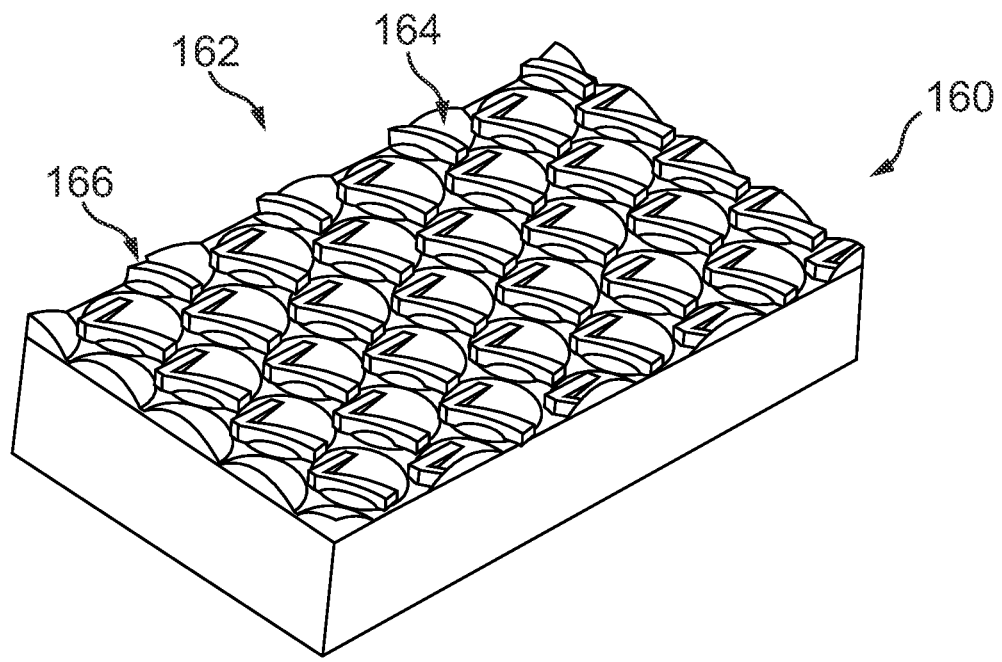
FIGS. 9 and 10 show isometric views of a third embodiment of a micro-optic device including a unitary structure of focusing elements and image elements.
Figure 10:
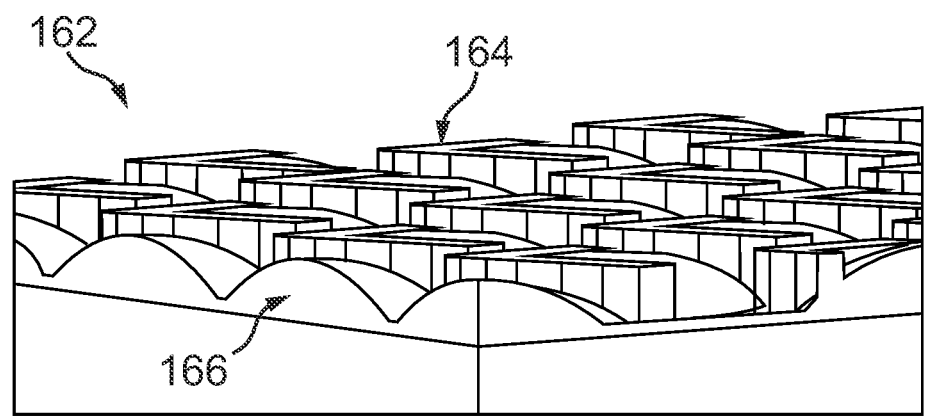

FIGS. 9 and 10 show an alternative embodiment in which a security device 160 includes a 3D topography 162 integrating an array of lens elements 164 and structures 166 in which are formed a series of image elements in the form of the numeral "7". In this example, the image elements extend outwardly from the lens elements. Advantageously, such an arrangement makes it possible to print a layer of coloured ink on top of the structure in which the image elements are formed without printing the coloured ink on top of the lens elements.

In other embodiments, both lenses and imagery may be over printed with coloured ink. From the exemplary embodiments depicted in FIGS. 7 to 10, it can be seen that in the areas of the integrated structure in which the lens elements and imagery do not overlap, the integrated structure has the same topography as the lenses or other focusing elements. In all other areas, the topography of the image elements may have one or more of the following attributes:

a) Topography is recessed relative to the adjacent focusing elements;

b) Topography is raised/protruding/extending above the adjacent focusing elements;

c) Topography is a constant height;

d) Topography is a diffraction grating;
e) Topography is a high roughness surface texture (for example optically diffuse/light scattering);
f) Topography is a low roughness surface texture (for example optically smooth/flat);
g) Topography is a light-extinguishing texture (for example high frequency/high aspect ratio structure which "extinguishes" the light intensity by causing the light to undergo a high number of total internal reflections i.e. compounding attenuation of the light amplitude via multiple reflections);
h) Topography is a surface perturbation/mathematical function of the focusing element topography; and
i) Topography has tapered side walls to allow easy release from an embossing tool.

In one or more embodiments, at least part of the topography of the imaging elements focuses light towards, or causes light to be diverged from or constructively interfere at a real or imaginary focal point. In such image elements at least part of their geometry is able to function as a revealing element (such as a refractive or diffractive lens revealing element). For example, the imaging element may consist of a refractive or diffractive lens surface that is recessed into the surface of a refractive or diffractive lens revealing element. In this case the walls separating the recessed image elements from the revealing lens elements are sampled to construct the optical effect image. The image elements in this example consist of the walls, while the areas in which there are no walls constitute the revealing lens elements.

In one or more embodiments, the image elements may also be over printed with the coloured ink in a subsequent process, particularly if the image elements are raised, protruding and/or extending above the adjacent focusing elements.

The topography of the focusing elements may have a variety of profiles including circular, elliptical, parabolic and conical.

In one or more embodiments, the focusing elements may have the above mentioned profile in a first direction only and extend in a second direction to form a cylinder, such as the cylindrical lens elements depicted in FIG. 7.

In other embodiments, the profile of the focusing element may be revolved about an axis extending perpendicularly from the surface of the substrate (Z axis), such as the circular focusing elements depicted in FIGS. 9 and 10.

In other embodiments of the invention, the topography of the focusing elements may include a diffractive lens topography, diffractive zone plate topography or a Fresnel lens topography.

The focusing elements can be arranged "packed" in any convenient manner, including in a rectangular or hexagonal array.

In different embodiments, the focusing elements may be refractive, reflective or diffractive. In embodiments, where the focusing elements are reflective, they may be conveniently be over-coated with at least a thin layer of at least partially reflective material to enable them to function as reflective focusing elements.

Since the image elements and the lens elements occupy the same region, the contrast of the projected image produced will be reduced depending on the proportion of the region that is occupied by the focusing elements and the proportion that is occupied by the image elements. Image element design is therefore important and designs that occupy a smaller proportion of the area of each lens element will produce brighter images, rather than designs which occupy a larger portion of the area of each lens element.

Figure 11:
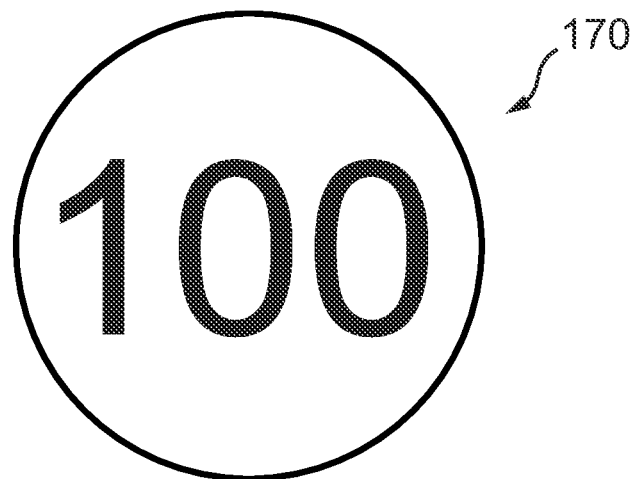
FIGS. 11 and 12 shown two exemplary image element designs for use in a micro-optic device.
Figure 12:
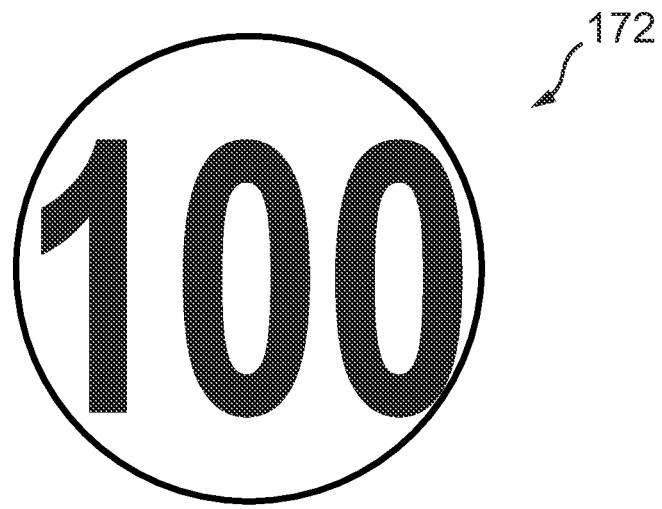

FIGS. 11 and 12 show two exemplary image element designs, respectively referenced 170 and 172. It can be seen that the image element design 170 occupies a smaller proportion of the total area of the image element than does the image element design 172. The image element design 170 will therefore produce a higher contrast moiré-magnified image.

As shown in FIGS. 13 to 20 25 and 26, the unitary structure includes a topography of lens elements and a topography of image elements integrated into a single integrated structure, and can be used in the manufacture of a number of different types of security devices.

Figure 13:
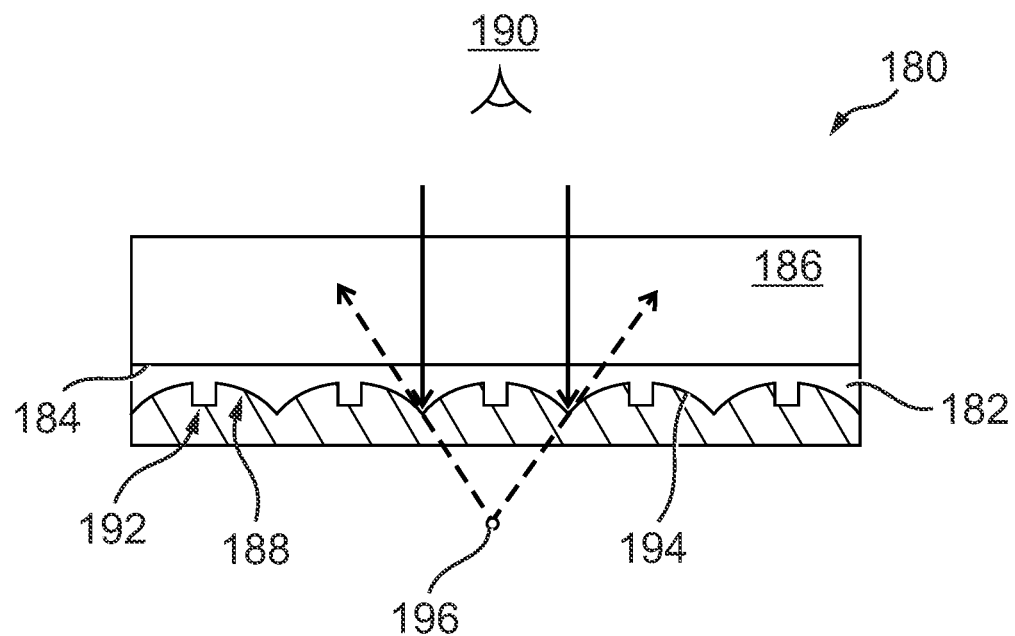
FIGS. 13 to 20 25 and 26 show cutaway side views of ten further embodiments of a micro-optic device including a unitary structure of focusing elements and image elements.

In the security device 180 shown in FIG. 13, a first unitary structure 182 is shown on a first side 184 of a transparent substrate 186. The unitary structure can be formed by embossing or by other techniques, such as printing. The unitary structure 182 includes a first focusing structure 188 including an array of focusing elements. In this case, each focusing element has a convex surface when viewed from a first viewing position 190 through the transparent substrate 186. The unitary structure 182 also includes an imagery structure including a group of image elements 192 which, in this case, are recessed into the convex surface of the focusing structure 188. In order for the convex surface of the focusing elements 188 to function as a mirror, a layer 194 of reflective material, which may, for example, be applied by printing, such as reflective silver, is applied to the convex surface viewed from the first viewing position 190.

For substantially collimated incoming light, the convex mirrors produce a virtual array of point sources 196 located behind the imagery structure 192. The imagery pattern formed by the image elements being recessed into the convex mirror surface has a recessed flat structure, however in other embodiments the imagery pattern can take on a variety of forms and surface textures as described previously.

Figure 14:
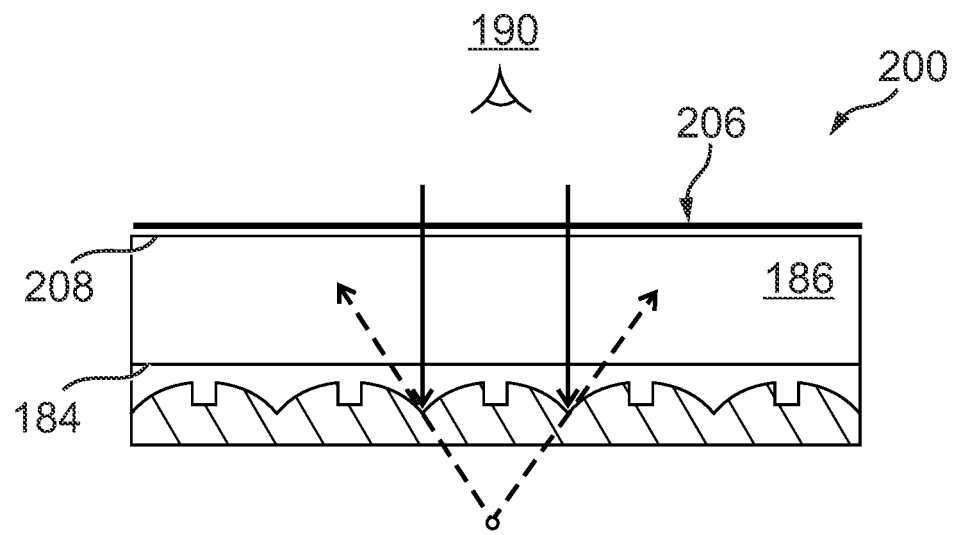
Figure 15:
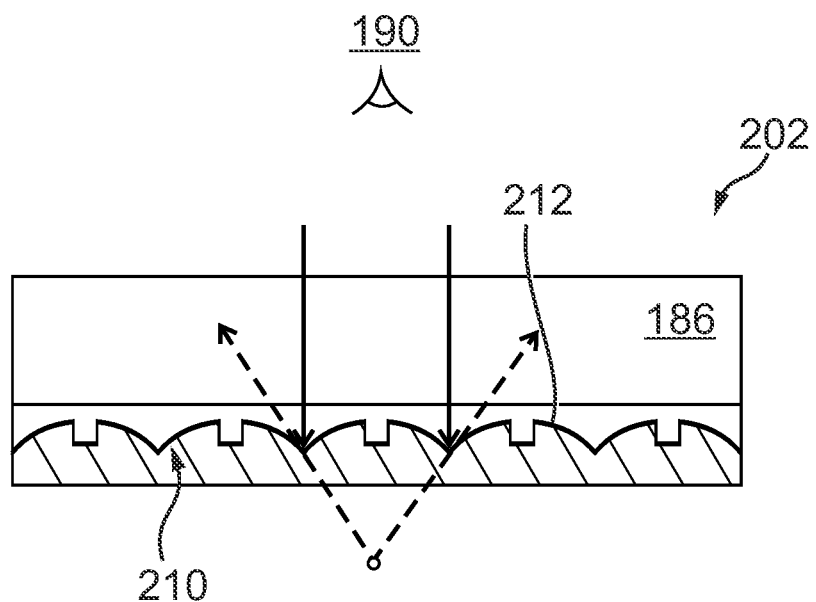
Figure 16:
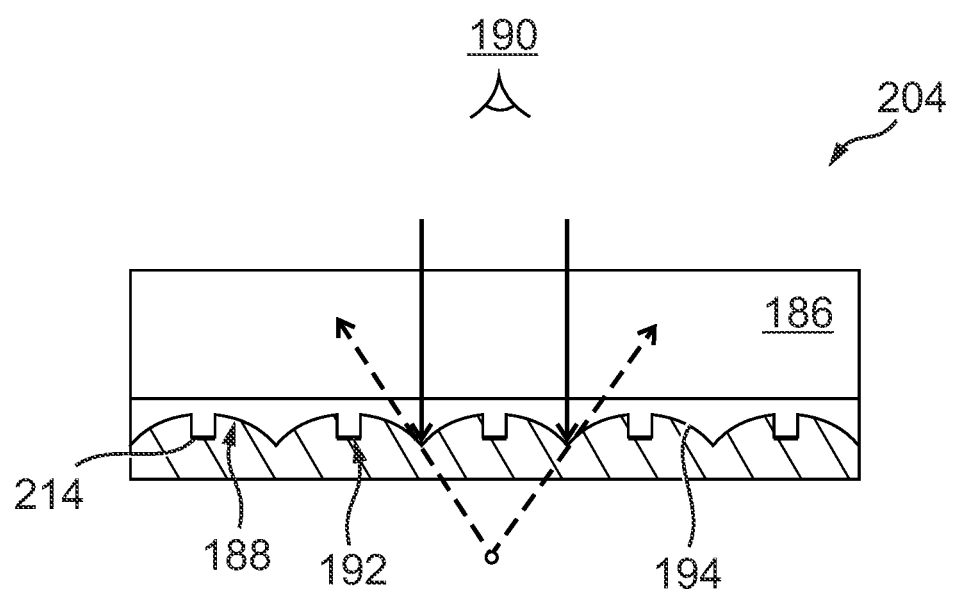

FIGS. 14, 15 and 16 depict security devices 200, 202 and 204 that are identical to the security device 180, except for the presence of a layer of coloured ink at different positions within the security device. For ease of reference, identical elements in each of the four security devices 180, 200, 202 and 204 have been labelled with the same reference numerals.

In the case of security device 200, a coloured layer 206 of ink has been applied to a side of the substrate 186 that is opposite the side 184 to which the integrated focusing elements and image element structure has been applied. Location of the coloured layer 206 of ink on the side 208 of the substrate 186 produces a tinted or coloured magnified image to an observer from the viewing position 190.

In variation to this arrangement, the security device 202 shown in FIG. 15 includes a printed layer 210 of coloured ink applied on top of the integrated structure of focusing elements and image elements, after that integrated structure is embossed into a clear UV-curable lacquer on top of the substrate 186 using UV embossing. The application of the thin layer of coloured ink on top of the embossed structure is then followed up with the application of an all-over reflective layer 212. Once again this arrangement produces a tinted or coloured magnified image from a first viewing position 190.

In a further variant 204 shown in FIG. 16, the imagery structure 192 includes image elements that extend slightly above the convex lens structures of the focusing structure 188. After the integrated focusing element and imaging element structure is embossed into a clear UV-curable lacquer on top of the polymer substrate 186, a thin layer 214 of coloured ink is printed on top of the imagery structure 192 only. This is then followed up with the application of an all-over reflective layer 194. Once again, a tinted or coloured magnified image is produced that is observable from the first viewing position 190.

Figure 17:
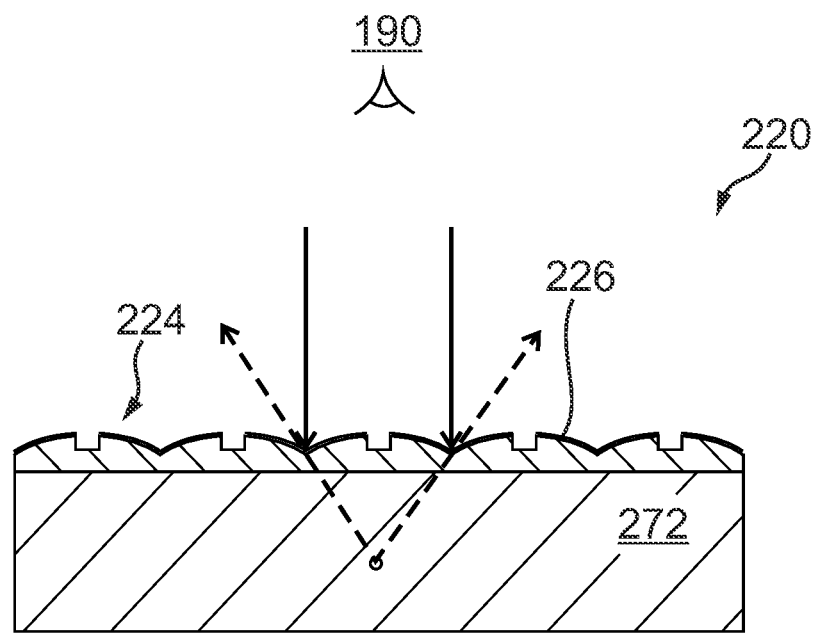

The security devices depicted in FIGS. 13 to 16 involve the embossing of concave structures into a clear UV-curable lacquer on top of the polymer substrate, which when viewed through the polymer substrate, ultimately form convex mirror focusing elements. An alternative embodiment is shown in FIG. 17, which depicts a security device 220 where a unitary structure including a focusing structure of focusing elements and an imagery structure of image elements, are embossed on a polymer substrate 222. The unitary structure 224 includes convex structures for focusing elements which are then coated with a thin layer 226 of reflective material such as silver to produce convex mirror surfaces.

Figure 18:
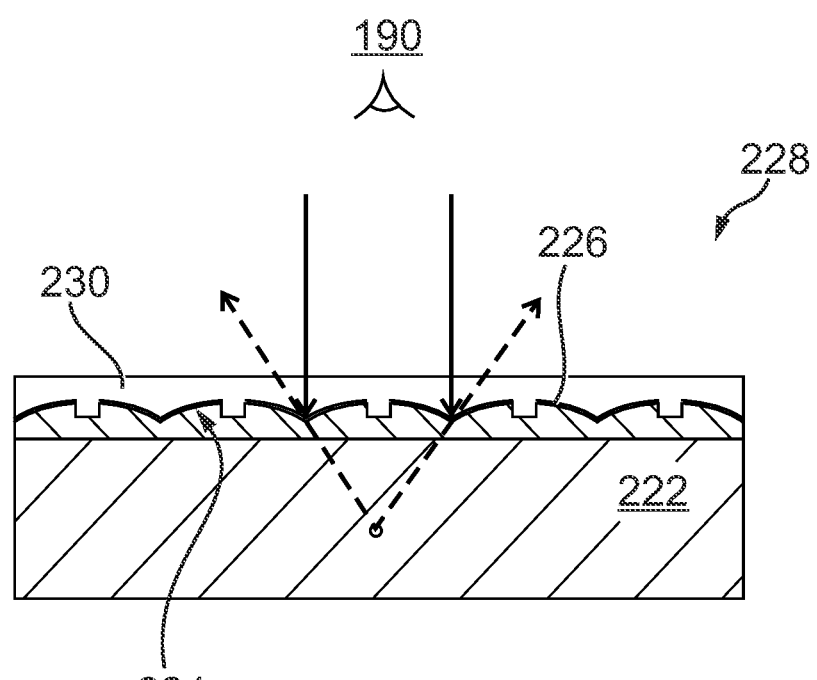

FIG. 18 depicts a security device 228 identical in most respects to the security device 220 depicted in FIG. 17 except that the unitary structure 224 and layer of reflective material 226 are over coated with a clear protective layer 230 to protect the focusing elements and image elements from mechanical copying—for example by electroforming—and to increase the physical and chemical durability of the structure—and also to prevent the ingress of dirt, grease, sweat or the like from filling the image elements and compromising the magnified image viewable from the first viewing location 190. It will be appreciated that in the case of the security devices 220 and 228, light is not transmitted through the substrate 222 and accordingly this substrate does not need to be transparent.

Figure 19:
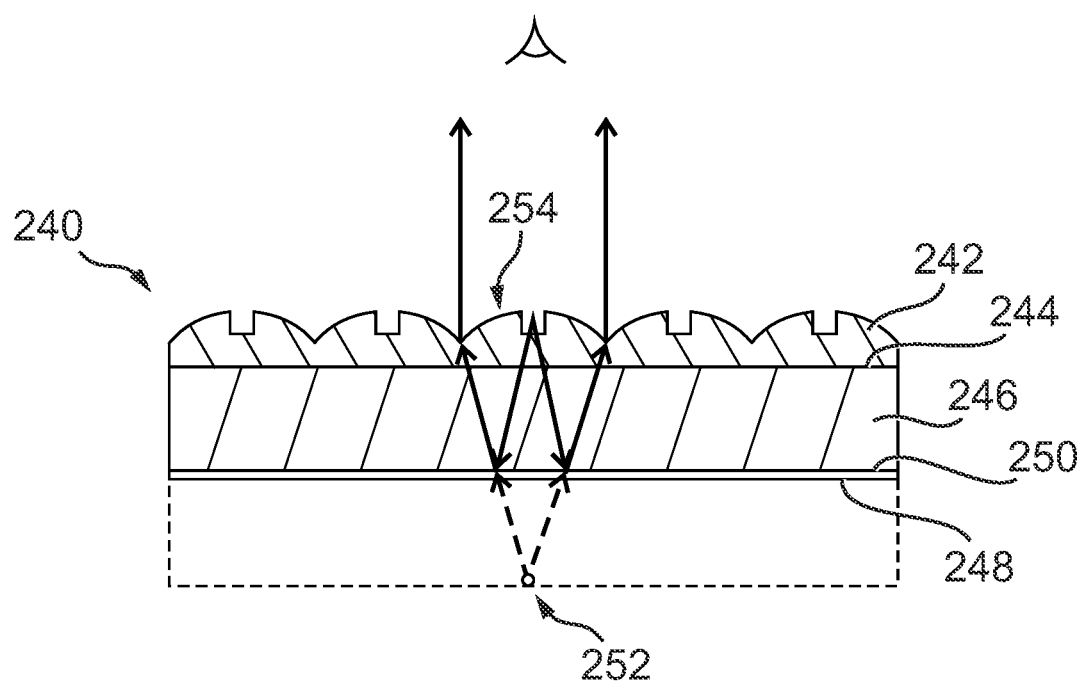

FIG. 19 depicts a security device 240 which uses refractive focusing elements as well as a reflective layer of material on the opposite side of the substrate to which the unitary structure integrating the focusing structure and imagery structure, is embossed. In this embodiment, convex refractive focusing elements and integrated imagery structures are simultaneously embossed by means of a unitary structure 242 on a first side 244 of the substrate 246. A thin layer of at least partially reflective material 248 is printed or otherwise applied to the opposite side 250 of the substrate 246. The reflective layer is placed inside the refractive focal length of each focusing element, ensuring that the image elements are sampled and magnified by each focusing element. Importantly, the virtual focus 252 of each focusing element 254 is located well beyond the reverse side 250 of the substrate 246. This means that for a given maximum embossing depth, a much wider focusing element can be used compared to conventional refractive lenses without integrated imagery.

Lens design parameters, which in the case of a circular profile lens include width, sag and radius of curvature, are a function of a distance between the lens vertex and the reflective layer, the refractive indices and thicknesses of the component layers of the lenses such as the polymer substrate layer and emboss layer. By selection of appropriate design parameters, it is possible to ensure that the imagery structure lies substantially within the depth of focus for each focusing element.

In each of the embodiments of the security device depicted in FIGS. 13 to 19, a unitary structure integrating a focusing structure of focusing elements and an imagery structure of imaging elements have been embossed or otherwise formed onto one side only of the substrate. In all cases, the focusing elements forming part of that focusing structure cause the image elements from the imagery structure forming part of that same unitary structure to be sampled so as to produce imagery observable to a user from a first viewing angle.

Figure 20:
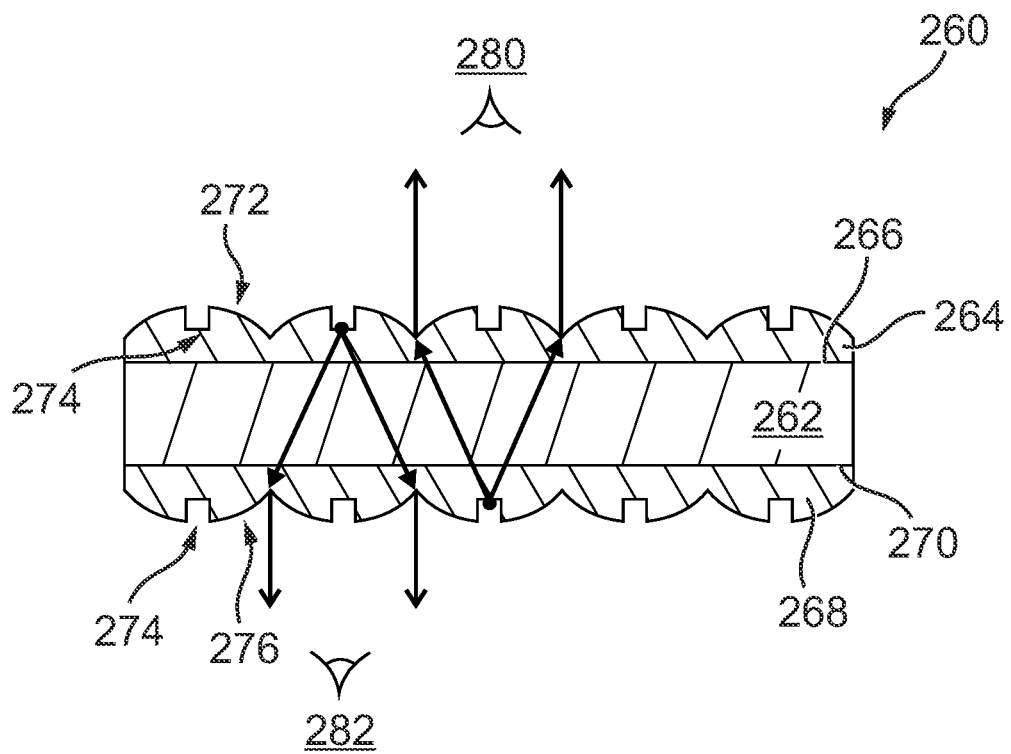

However in other embodiments of the invention, unitary structures integrating a focusing structure of focusing elements and an imagery structure of image elements can be applied to both sides of the substrate. One such example is depicted in FIG. 20 which shows a security device 260 including a substrate 262, a first unitary structure 264 applied to a first side 266 of the substrate 262 and a second unitary structure 268 applied to a second side 270 of the substrate 262. The first unitary structure 264 includes a first focusing structure 272 including a first group of focusing elements and a first imagery structure 274 including at least a first group of image elements, whereas the second unitary structure 268 includes a second focusing structure 276 including at least a second group of focusing elements and a second imagery structure 278 including at least a second group of image elements.

In such an arrangement, the first group of focusing elements causes the second group of image elements to be sampled and magnified as to project imagery which is observable to a user from at least the viewing position to 280, whereas the second group of focusing elements causes the first group of image elements to be sampled and magnified so as to project imagery which is observable to a user from a viewing position 282 on the opposite side of the security device 260.

In the embodiment depicted in FIG. 20, the focusing elements are refractive lens elements having a convex surface. However, instead of having a thin layer of reflective material printed on the opposite side of the substrate as is the case in the security device 240 depicted in FIG. 19, a second unitary structure is applied to that opposite surface. The dimensions of the two unitary structures and of the polymer substrate should be selected so that the image elements of the second unitary structure are located substantially at the real focus of the lens elements (preferably within their focal depth) of the first unitary structure. Similarly, the image elements of the first unitary structure should be located substantially at the real focus of the focusing elements of the second unitary structure (preferably within their focal depth).

Each of the embodiments depicted in FIGS. 13 to 20 and 26 have involved either reflective or refractive focusing elements that cause light to focus towards or be diverged away from a real or imaginary focal point. However, it should be understood that focusing elements, other than those which rely upon reflection or refraction can be used in other embodiments of the security device. For example, focusing elements in the form of zone plates or other devices that cause diffracted light to constructively interfere at a real or virtual focus may also be used. For example, focusing elements based on transmitted diffracted light or reflected diffracted light may also be used.

Figure 25:
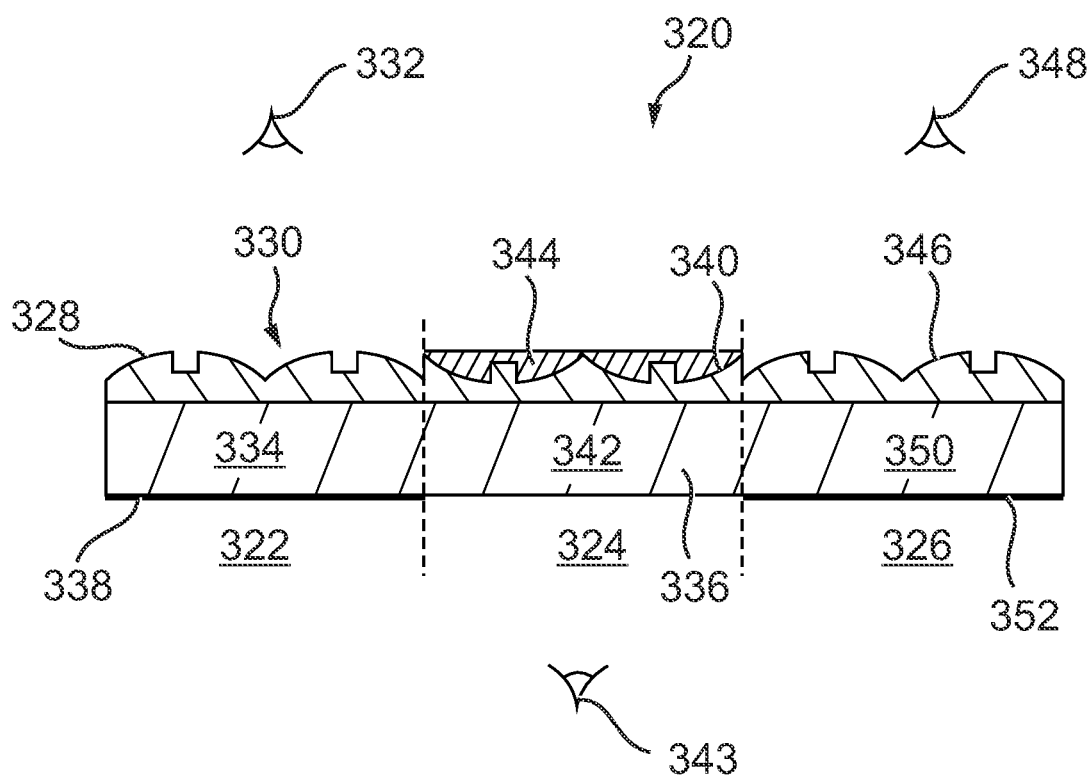

FIG. 25 depicts a security device 320 includes aspects of the security devices shown in FIGS. 13 and 19. The security device 320 includes three contiguous zones 322, 324 and 326. In the first zone 322, image elements are integrated with focusing elements in a first portion 328 of a unitary structure 330 applied to one side of a transparent substrate 336 extending across all zones 322 to 326. In this case, each focusing element is refractive and has a convex surface when viewed from a first viewing position 332 on the same side of the first portion 334 of the transparent substrate 336 as the first portion 328 of a unitary structure 330. The image elements are recessed into the convex surfaces. In order for the convex surface of the focusing elements to refract light so as to sample their corresponding integrated image elements, a printed layer 338 of at least partially reflective material, such as ink, is applied to the opposite side of the first portion 334 of the transparent substrate 336.

In the second zone 324, image elements are integrated with focusing elements in a second portion 340 of the unitary structure 330. In this case, each focusing element is reflective and has a convex surface when viewed from a second viewing position 343 on the opposite side of a second portion 342 of the transparent substrate 336 from the unitary structure 330. In order for the convex surface of the focusing elements to function as a mirror, a printed layer 344 of at least partially reflective material, such as silver ink, is applied to the opposite (concave) side of the second portion 340 of the unitary structure 330 to that seen from the second viewing position 343.

In the third zone 326, image elements are integrated with focusing elements in a third portion 346 of the unitary structure 330. As was the case with the first portion 328 of the unitary structure 330, each focusing element of the third portion 346 of the unitary structure 330 is refractive and has a convex surface when viewed from a third viewing position 348 on the same side of a third portion 350 of the transparent substrate 336 as the third portion 346 of the unitary structure 330. In order for the convex surface of the focusing elements to refract light so as to sample their corresponding integrated image elements, a printed layer 352 of at least partially reflective material, such as silver ink, is applied to the opposite side of the third portion 350 of the transparent substrate 336. If the distance between the observer and the security device is sufficiently large then the viewing angles corresponding to the first viewing position 332 and third viewing position 348 will be substantially the same therefore each refractive lens element will contribute a portion of the total optical effect image seen by the observer viewing that side of the device. Similarly if the observer viewing the other side of the device in viewing position 343 is sufficiently distant from the device then each reflective lens element will contribute a portion of the total optical effect image seen by the observer viewing that side of the device.

An advantage of the arrangement in FIG. 25 is that images projected from each side of the substrate can be designed so they appear to occupy the same area on the banknote. For example, the image projected from a front side of the banknote may be projected by refractive unitary structures, and the image projected from a back side of the banknote may be projected by reflective unitary structures, and the refractive and reflective unitary structures may occupy 1st and 2nd regions respectively on the same side of the banknote wherein 1st and 2nd regions are interlaced (for example, interlaced in the same way that the imagery channels of a 2 channel flipping lenticular image are interlaced).

The interlacing arrangement of the 1st and 2nd regions is just one example of arranging the 1st and 2nd regions, and other such arrangements are also possible. For example, the 1st region could occupy the "black" squares of a checkerboard pattern and the 2nd region would occupy the "white" squares of the same checkerboard pattern.

Figure 26:
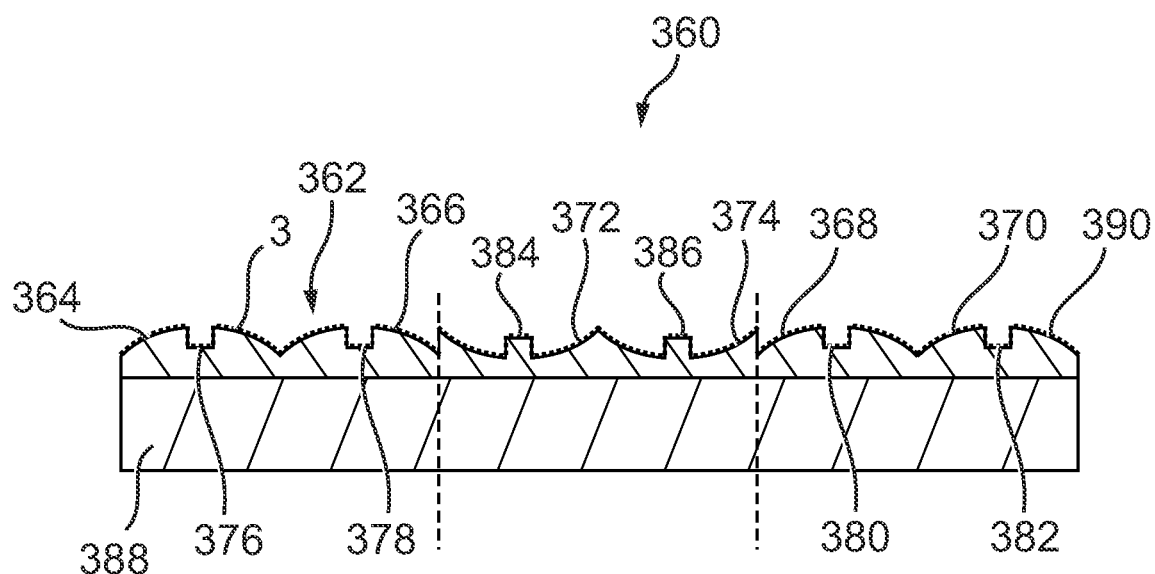

FIG. 26 shows a variation to the arrangement shown in FIG. 25. In the security device 360 shown in FIG. 26, the unitary structure 362 consists entirely of reflective convex lens elements and integrated imagery elements, and there is no reflective layer present on the side of the substrate that is opposite to the side with the unitary structure. In FIG. 26 there are four reflective convex lens elements 362 to 370 (each with an integrated image element respectively referenced 376 to 382) present in the unitary structure that project a portion of the total optical effect image projected upwards from the unitary structure, and there are two reflective convex lens elements 372 and 374 (each with an integrated image element 384 and 386) present in the unitary structure oriented to project a portion of the total optical effect image projected downwards from the unitary structure through the substrate 388. An advantage of the arrangement depicted in FIG. 26 (compared to the arrangement in FIG. 25) is that registration of the at least partially reflective layer 390 to the unitary structure 364 is not required. Optionally the at least partly reflective layer in FIG. 26 may be over-coated with a clear protective layer (not shown in FIG. 26).

In selecting the parameters of the focusing elements, image elements and substrate, it should be noted that some security documents such as polymer bank notes, will generally have a limited maximum embossed depth because the UV lacquer that is typically applied to a bank note substrate in order to create an embossed unitary structure will have a limited possible thickness. Moreover, the maximum embossing depth limits the maximum width of a refractive lens that can be deployed on a polymer bank note. In turn, this limits the complexity that can be achieved in the optical effect images produced by refractive lenses because there is a limited area under each lens element in which to place image elements of a desired resolution.

Figure 21:
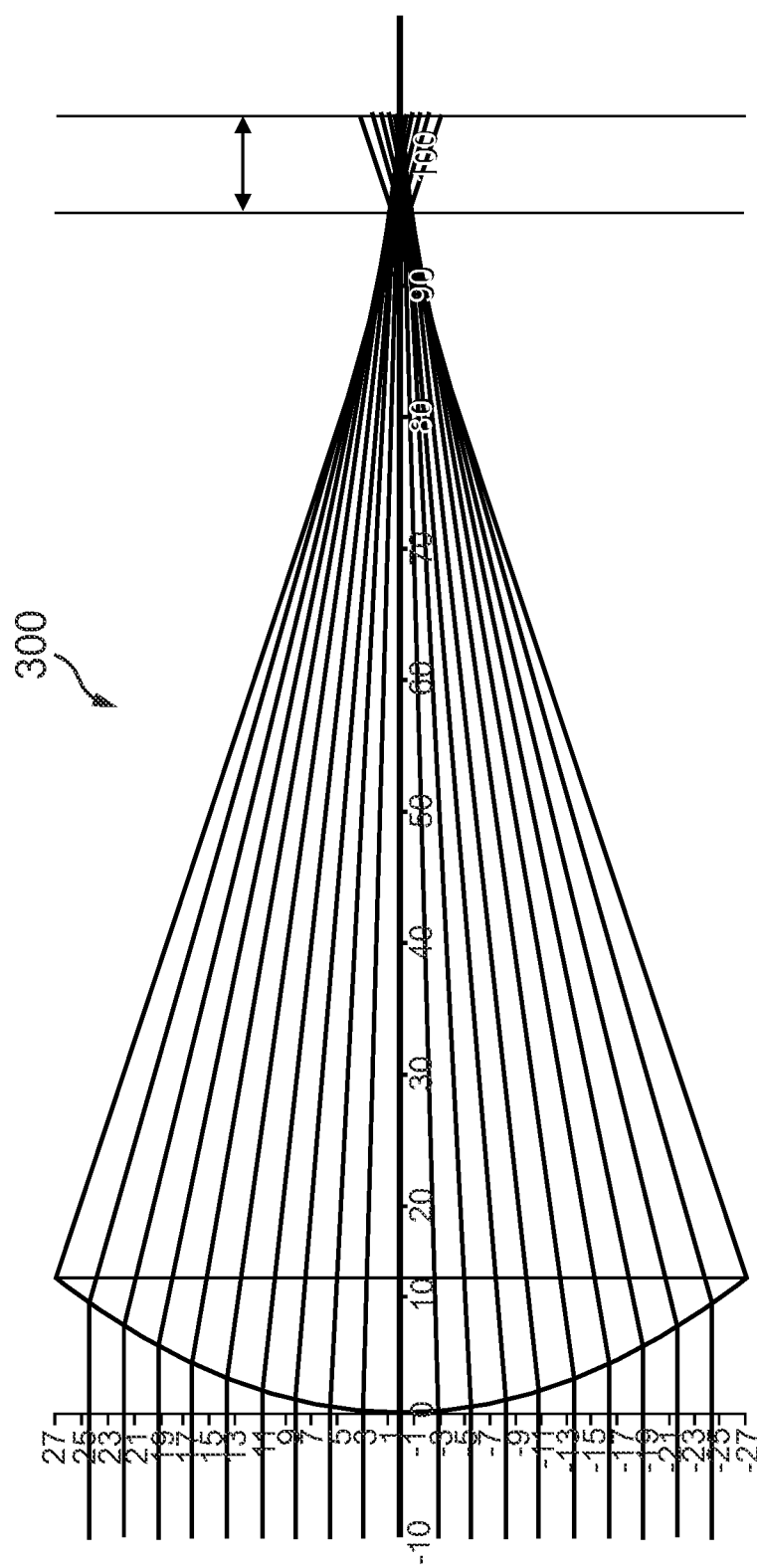
FIG. 21 is a ray trace model of a conventional refractive lens.

By way of illustration, FIG. 21 depicts a ray trace model 300 of a conventional refractive lens of the type shown in FIGS. 3 to 6. In this case refractive lenses are applied to one side of a substrate and image elements are applied on the opposite side of the substrate. The lens depicted has a lens width of 51 microns, an embossing depth (sag) of 11 microns, and focal depth of 99 microns. The lens will produce sharp images for imagery elements located substantially close to the focal plane, that is, located 90 to 99 microns from the lens vertex.

Figure 22:
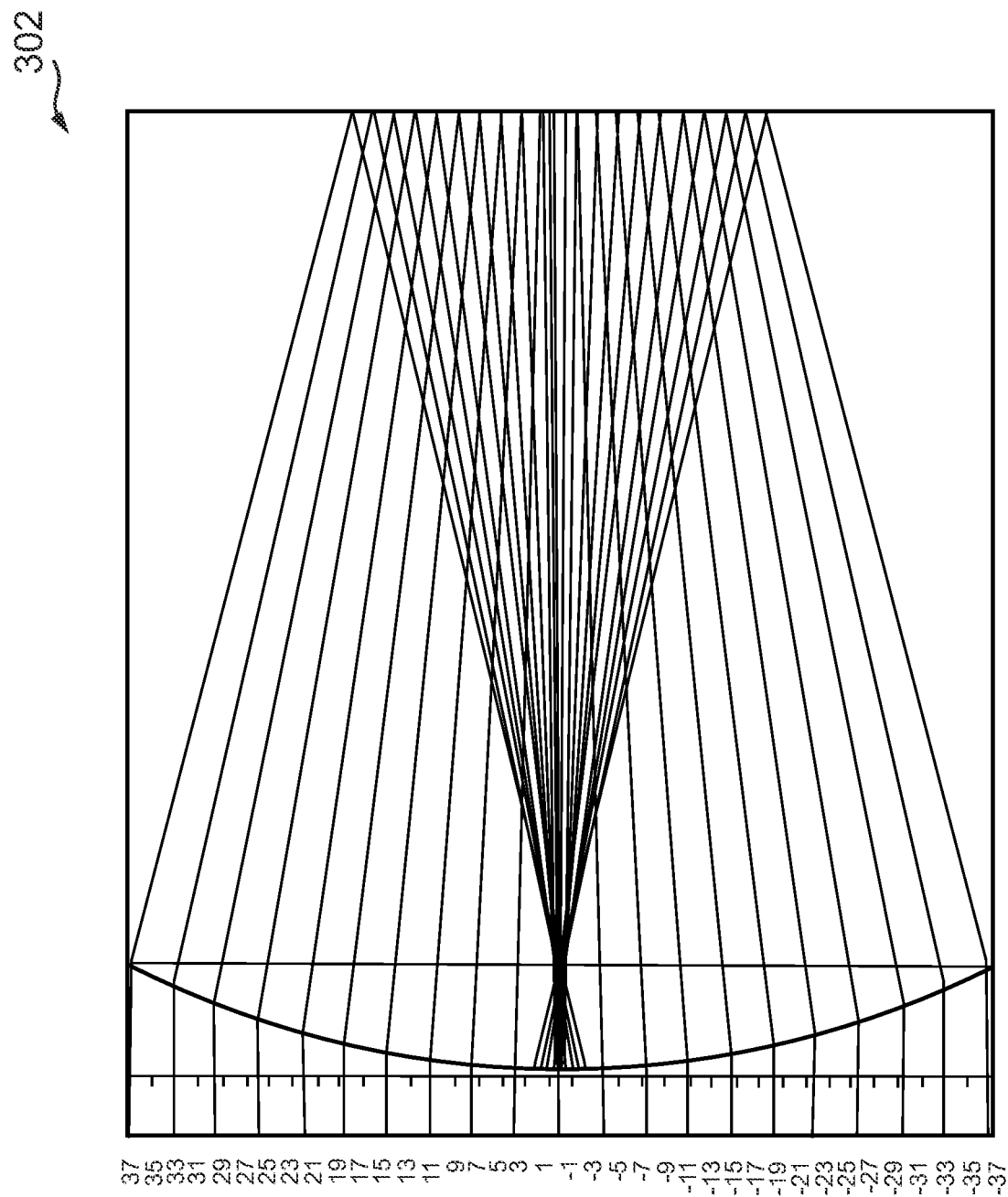
FIGS. 22 and 23 are ray trace models respectively of an individual refractive lens element and an array of refractive lens elements formed on one side of a micro-optic device and having a reflective layer formed on the other side.
Figure 23:
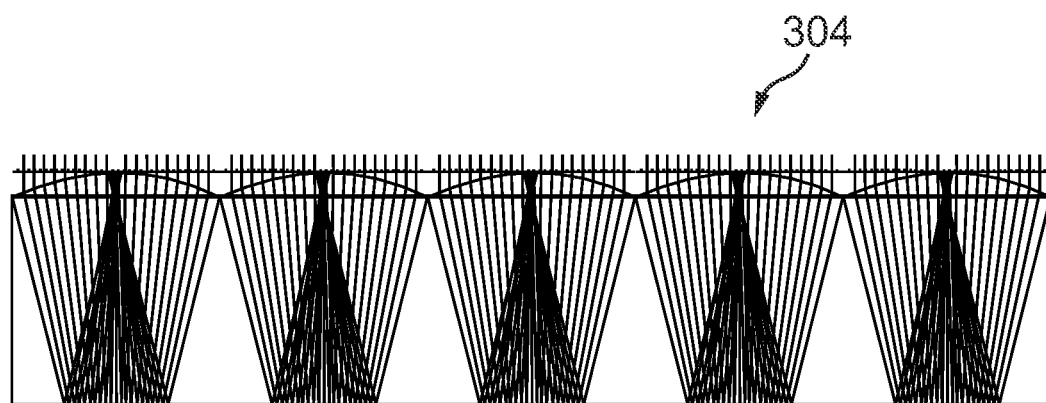

FIGS. 22 and 23 depict ray trace models of an individual refractive lens element and an array of refractive lens elements respectively for the security device 240 depicted in FIG. 19. By coating the opposite side of the substrate to that on which the unitary structure including a focusing structure of focusing elements and an imagery structure of image elements is applied, it can be seen that when using the same embossing depth of 11 microns, the lens width is now 74 microns which is clearly much larger than the 51 microns width of the conventional arrangement. In other words, much more space is provided underneath each lens element to place imagery so that optical effect images observed by a user can be far more complex with this arrangement.

The embodiments of the invention described above are, generally, described as being formed by embossing of structures into a UV curable material. Whilst this is the preferable method of forming the unitary structures, the embodiments are not limited to that method of manufacture only and may also be formed by alternative process steps to generate the same structures. For example, the structures may also be formed by printing, etching or any other suitable method of manufacture. They also may be formed in other radiation curable materials or by direct embossing into suitable pliable materials. The structures may be formed separately, such as on a foil, and laminated or hot stamped on to a substrate.

Figure 24:
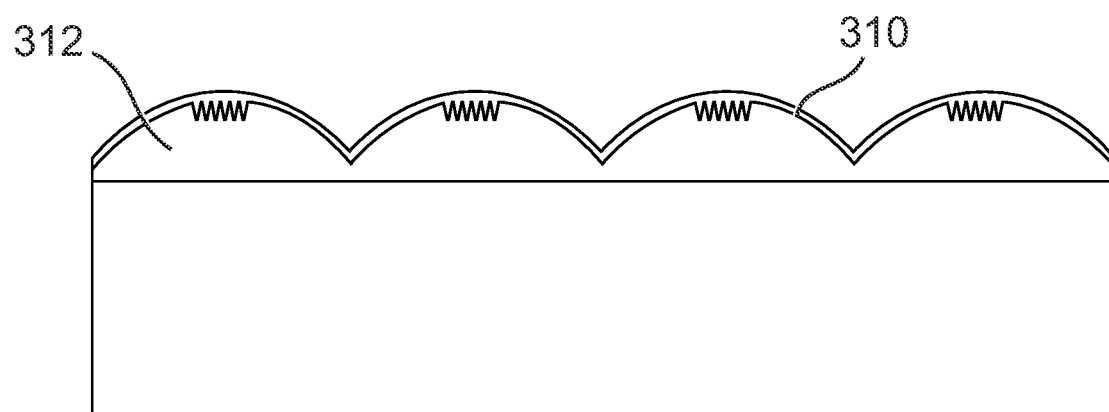
FIG. 24 is a cutaway side view of another embodiment of a micro-optic device including a unitary structure of focusing elements and image elements, where the image elements are diffractive structures.

In FIG. 24, the integrated focusing element and image element structure, being a unitary structure, 312 is shown with the image elements being formed from a diffractive structure. The unitary structure 312 may optionally be over coated with a thin layer 310 of material that has a different refractive index than that of the UV-cured resin in which the integrated focusing element and image element structure 312 is embossed. For example, this layer may have a high refractive index and may be applied as a printed layer that covers both lens elements and image elements. If the layer is sufficiently thin (compared to the sag of the lens), it will not adversely impact the imaging function or focal length of the lens element. On the other hand if the layer is thicker, the lens/sag profile of the focusing element may be designed to accommodate this layer thickness and refractive index so that the imaging function and required focal length of the lens is preserved. A benefit of the arrangement depicted in FIG. 24 is that it prevents the imagery elements from being copied through electroforming because the surface structure of the imagery elements is now flat when compared to the surrounding and adjacent lens elements. It should be noted that layer of material that has a different refractive index than that of the UV-cured resin described above in relation to FIG. 24, is also applicable to all of the embodiments describe above.

As mentioned previously, another benefit of such an arrangement is that sweat or other liquids are prevented from filling the imagery structures. For example if the imagery structure consists of diffraction gratings that create a coloured magnified image, the magnified image would be largely lost if the structure becomes filled with water since water has a similar refractive index to the UV embossed resin of the structures.

The 2D or 3D focusing elements and image elements can be formed by any suitable manufacturing process, including the following non-limiting exemplary security print processes: offset, foil application, screen printing, intaglio, letterpress and overcoating. In the embodiments described herein, an embossing shim is used to emboss the unitary structure, including a focusing structure of focusing elements and an imagery structure of image elements, on one or both sides of the substrate. A number of different techniques for manufacturing such an embossing shim are described below:

Laser Micro-Machining Approach/Laser Lithography

Excimer laser micro-machining has been used in the past to machine 3-D micro-structures including masters for mould tooling (see for example: Jolic K I, Ghantasala M K and Harvey E C, "Excimer laser machining of corner cube structures", Journal of Micromechanics and Microengineering, Vol. 14, no. 3 (2004), pp. 388-397).

Excimer lasers have also been used in the past to make refractive micro-lens arrays (an example of a company who do this are Optec s.a., ZAE Le Crachet, Avenue des Nouvelles Technologies, 53, B-7080 Frameries Belgium).

Laser micro-machining techniques based on mask projection (i.e. laser ablation) could therefore be used to laser machine integrated refractive micro-lenses and micro-imagery, into a material such as polycarbonate, to form a master mould. The micro-imagery elements could be machined as recessed areas in the master mould. They could also be machined as micro-structured surface texture. The master mould could then be electroplated, to form an embossing metal shim.

Alternatively, the micro-lenses (concave or convex or diffractive) could be pre-fabricated (using established methods—for example hot-embossing) in a material such as polycarbonate. Laser micro-machining techniques based on mask projection could then be used to laser machine the micro-imagery directly into the lenses (the micro-imagery elements could be machined as recessed areas that are flat; they could also be machined as micro-structured surface texture) to complete the integrated master mould. The master mould could then be electroplated to form an embossing metal shim.

Alternatively, laser micro-machining techniques using mask projection could be used to make the imagery component of the integrated structure as follows: (i) coat the lens metal master (concave or convex or diffractive; previously fabricated using established techniques e.g. electroforming from lens master mould) with a layer of laser machine-able dry film resist; (ii) use laser to micro-machine 2-D imagery pattern in the dry film resist to expose underlying lens metal layer (i.e. remove dry film resist completely in areas corresponding to imagery pattern); and (iii) chemically etch the exposed metal areas to make these areas recessed &/or textured—or alternatively electroplate the exposed areas to make these areas extend above the neighbouring lens surface.

UV Lithography Technique

UV lithography techniques may also be used to fabricate master moulds of integrated micro-lenses and micro imagery structures. This could be achieved as follows: (i) coat the lens metal master (concave or convex or diffractive—previously fabricated using established techniques e.g. electroforming from lens master mould) with a (preferably planar) layer of photo-resist; (ii) use mask aligner to UV-expose the 2-D imagery pattern in the photoresist; (iii) chemically develop the UV-exposed photoresist layer so as to expose the underlying metal layer of the lens master in the areas of the 2-D imagery pattern; (iv) chemically etch the exposed metal areas to make these areas recessed &/or textured—or alternatively electroplate the exposed areas to make these areas extend above the neighbouring lens surface.

Direct Laser Writing

It is conceivable that direct laser writing methods (maskless laser lithography, grey tone lithography) could also be used to manufacture integrated micro lens and micro imagery structures. These methods involve X-Y raster scanning a laser beam that is focused on the photoresist surface. The dosage of the laser beam is spatially varied in X and Y, in accordance with the desired structure depth at each point. The photoresist is then developed to produce the 3-D surface. An example machine with this technology is the DWL 425 (Heidelberg Instruments, Germany).

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

It will be understood that the invention is not limited to the specific embodiments described herein, which are provided by way of example only. The scope of the invention is as defined by the claims appended hereto.

The invention claimed is:

1. A micro-optic device, including:
   a substrate having a first and a second side, opposite the first side;
   a plurality of image elements;
   a plurality of focusing elements, the focusing elements each having a convex surface, each one of the focusing element focusing light towards, or causing light to be diverged from or constructively interfere at a real or imaginary focal point; and
   a first focusing structure including at least a first group of the focusing elements and a first imagery structure including at least a first group of the image elements integrated into a first unitary structure on the first side of the substrate;

wherein the topography of the image elements is raised, protruding or extending above the convex surfaces of adjacent focusing elements and the focusing elements cause, at least, some of the image elements to be sampled so as to project imagery which is observable to a user from, at least, a first viewing angle, and wherein the image elements each have a planar upper surface.

2. A micro-optic device according to claim 1, wherein the first group of focusing elements causes the first group of image elements to be sampled.

3. A micro-optic device according to claim 1, wherein a second focusing structure including at least a second group of the focusing elements and a second imagery structure including at least a second group of the image elements is located on the second side of the substrate.

4. A micro-optic device according to claim 3, wherein the second focusing structure and the second imagery structure are integrated into a second unitary structure.

5. A micro-optic device according to claim 4, wherein the image elements of the first unitary structure are located substantially at, or within the real focus of the focusing elements of the second unitary structure, and the image elements of the second unitary structure are located substantially at, or within the real focus of the focusing elements of the first unitary structure.

6. A micro-optic device according to claim 3, wherein the first group of focusing elements causes the second group of the image elements to be sampled.

7. A micro-optic device according to claim 1, wherein at least one focusing element is refractive and causes light to refract towards the focal point.

8. A micro-optic device according to claim 1, wherein at least one focusing element is diffractive and transmits or reflects light causing constructive interference of light at the focal point or divergence of light from the focal point.

9. A micro-optic device according to claim 1, including a layer of reflective or partially reflective material on the second side of the substrate.

10. A micro-optic device according to claim 9, wherein the reflective layer is located inside the focal length of the focusing elements.

11. A micro-optic device according to claim 1, wherein at least one of the focusing elements are refractive lens elements.

12. A micro-optic device according to claim 1, and further including a layer of reflective or partially reflective material applied to the convex or concave surface viewed from the first viewing position.

13. A micro-optic device according to claim 1, wherein the topography of the focusing elements has one or more of the following profiles: circular, elliptical, parabolic and conical.

14. A micro-optic device according to claim 1, wherein at least part of the topography of the focussing elements focuses light towards, or causes light to be diverged from or constructively interfere at a real or imaginary focal point.

15. A security device incorporating a micro-optic device according to claim 1.

16. A security document incorporating a micro-optic device according claim 1.

17. A micro-optic device according to claim 1, wherein the image elements have a constant height.

18. A micro-optic device according to claim 1, wherein the image elements are overprinted with a colored ink without the colored ink being printed on the focusing elements.

19. A micro-optic device according to claim 1, wherein the image elements include tapered side walls to allow easy release from an embossing tool.

20. A micro-optic device, including:
a substrate having a first and a second side, opposite the first side;
a plurality of image elements;
a plurality of focusing elements, the focusing elements each having a convex surface, each one of the focusing element focusing light towards, or causing light to be diverged from or constructively interfere at a real or imaginary focal point; and
a first focusing structure including at least a first group of the focusing elements and a first imagery structure including at least a first group of the image elements integrated into a first unitary structure on the first side of the substrate;
wherein the topography of the image elements is raised, protruding or extending above the convex surfaces of adjacent focusing elements and the focusing elements cause, at least, some of the image elements to be sampled so as to project imagery which is observable to a user from, at least, a first viewing angle, and
wherein the image elements have a constant height above the substrate.

21. A micro-optic device, including:
a substrate having a first and a second side, opposite the first side;
a plurality of image elements;
a plurality of focusing elements, the focusing elements each having a convex surface, each one of the focusing element focusing light towards, or causing light to be diverged from or constructively interfere at a real or imaginary focal point; and
a first focusing structure including at least a first group of the focusing elements and a first imagery structure including at least a first group of the image elements integrated into a first unitary structure on the first side of the substrate;
wherein the topography of the image elements is raised, protruding or extending above the convex surfaces of adjacent focusing elements and the focusing elements cause, at least, some of the image elements to be sampled so as to project imagery which is observable to a user from, at least, a first viewing angle, and
wherein the image elements include tapered side walls to allow easy release from an embossing tool.

* * * * *